April 27, 1954

P. KOLLSMAN 2,676,603

FLUID FLOW DIVIDER

Filed April 12, 1946

INVENTOR.
PAUL KOLLSMAN,
BY
Albert M. Austin
his ATTORNEY

INVENTOR.
PAUL KOLLSMAN,
BY
Albert M. Austin
his ATTORNEY

Patented Apr. 27, 1954

2,676,603

UNITED STATES PATENT OFFICE 2,676,603

FLUID FLOW DIVIDER

Paul Kollsman, New York, N. Y.

Application April 12, 1946, Serial No. 661,654

14 Claims. (Cl. 137—118)

This invention relates to the control of flows of fluid and more particularly to the division of a main flow into branch flows so as to maintain a predetermined relation between the individual branch flows and the main flow.

The invention provides an apparatus for dividing a main flow of fluid into branch flows of predetermined magnitude. The invention further provides apparatus for producing fractional branch flows of fluid which may be of the order of one-tenth, one hundredth or one-thousandth of a main flow.

It is well known that the production and control of very small flows of fluid offers particular problems due to the difficulty of controlling small flows with sufficient accuracy. The present invention offers a very convenient solution for problems of this character by providing apparatus which from large readily controllable flows of fluid divides a fractional flow or fractional flows with great accuracy and thus produces minute flows of accurately controlled volume.

The invention further provides improved and advantageous ways and means of flow ratio control by use of conventional or standard control equipment. For example, equipment for the maintenance and control of a predetermined fixed ratio between flows of fluid may be employed for maintaining any desired other ratio by splitting the controlled flow into a fractional flow of the desired magnitude, which is utilized, and a residual flow which is returned to its source. The invention thus permits, for example, use of regulator equipment originally designed for maintaining constant a ratio of one to one between two flows for producing any other desired flow ratio, which may even be changed from time to time by simple adjustment of apparatus provided by the present invention.

The objects, features and advantages of this invention will appear more fully from the detailed description which follows accompanied by drawings showing for the purpose of illustration preferred embodiments of the invention.

The invention also consists in certain new and original features of construction and combination of parts hereinafter set forth and claimed. Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which, Figure 1 is a diagrammatic illustration showing the use of a fluid flow proportioner in connection with the fuel supply regulator of an internal combustion engine;

Figure 1:
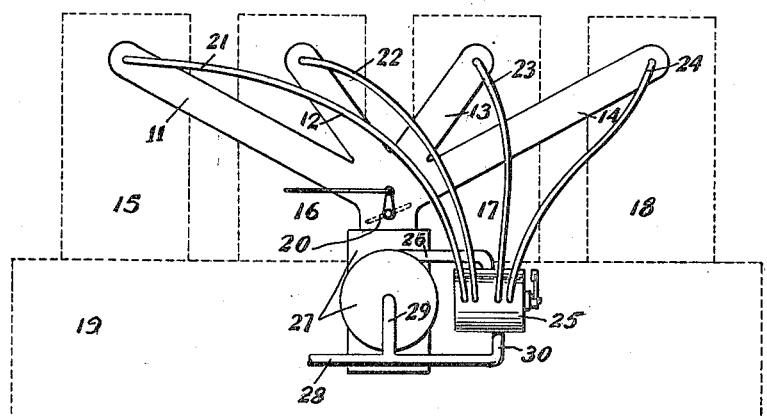

In the following description and in the claims various details will be identified by specific names for convenience. The names however, are intended to be as generic in their application as the art will permit.

Like reference characters refer to like parts in the several figures of the drawings.

In the drawings accompanying, and forming part of, this specification, certain specific disclosure of the invention is made for the purpose of explanation of broader aspects of the invention, but it is understood that the details may be modified in various respects without departure from the principles of the invention and that the invention may be applied to other structures than the ones shown.

In the description and in the claims the term "pressure fluid" or "fluid" is used as a generic term to include both compressible as well as non-compressible fluids, that is, gases and liquids.

Intake ducts 11, 12, 13 and 14 lead to the cylinders 15, 16, 17, and 18 of an internal combustion engine 19. The flow through the intake ducts is controlled by a throttle 20. Fuel branch lines 21, 22, 23, and 24 lead to the ends of the respective intake ducts 11, 12, 13, and 14 and extend from a fluid flow proportioner 25 supplied with fuel through a supply duct 26. The supply duct 26 connects the fluid flow proportioner with a regulator 27 which maintains the flow of fuel passing through the supply duct 26 in a predetermined fixed relation with respect to the amount of air flowing into the intake ducts past the throttle 20. Fuel is supplied to the regulator through supply lines 28 and 29 and excess fuel is returned to the regulator 27 from the fluid flow proportioner through a return duct 30.

The regulator 27 may be of any conventional construction, the only requirement being that it should be able to discharge fuel through the supply duct 26 leading to the fluid flow proportioner 25 at a pressure greater than the pressure at which fuel is supplied to the regulator 27 through the supply line 28, so as to maintain a substantial pressure differential across the fluid flow proportioner. The regulator may have the form disclosed in my Patent No. 2,526,673 (my copending application Ser. No. 650,868). However, conventional regulators equipped with a pump for stepping up the pressure may be employed. The ratio of fuel to air maintained by the regulator is of secondary importance, since, according to the invention, the actual quantity control is performed by the fluid flow proportioner. It is for this reason satisfactory, for example, to employ a regulator which will maintain a ratio of one to one between air and fuel. Assuming a ratio of one part fuel to fourteen parts of air is to be maintained for the operation of the internal combustion engine, the fluid flow proportioner is then adjusted to feed a total of one part of the fuel supplied by the regulator to the engine while returning thirteen parts to the regulator.

Figure 3:
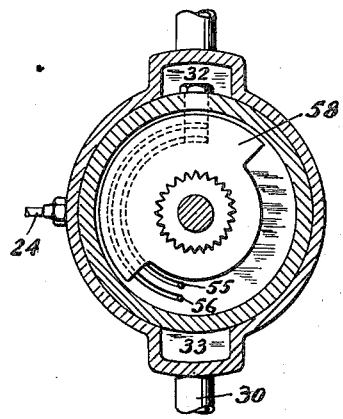
Figure 3 is a sectional side view of the apparatus shown in Fig. 2, a section being taken on line 3—3 of Figure 2.
Figure 2:
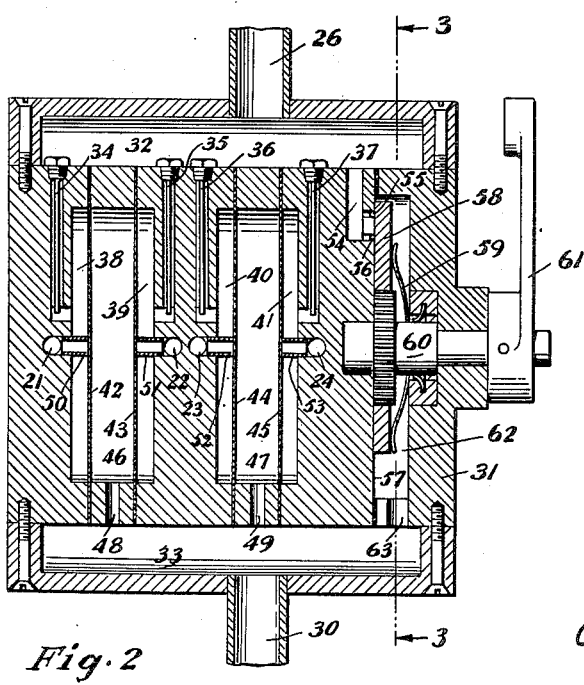
Figure 2 is a vertical cross sectional view of the fluid flow proportioner of Fig. 1.
Figure 4:
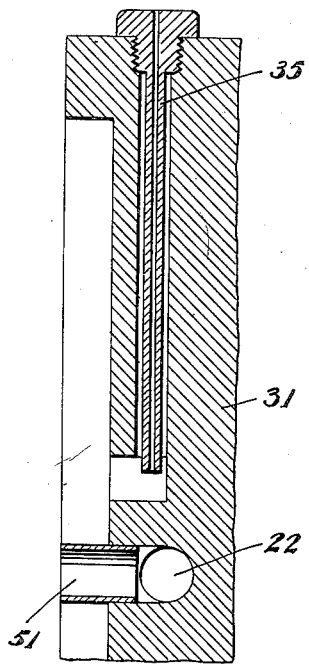
Figure 4 is a detailed view on an enlarged scale, of a capillary tube and valve seat of the device shown in Fig. 2.

The construction of the fluid flow proportioner 25 is shown in greater detail in Figures 2 to 4.

In instrument casing 31 comprises a common supply chamber 32 supplied with fluid through the supply duct 26, and a suction chamber 33 from which the return duct 30 leads back to the regulator.

Individual capillary tubes 34, 35, 36, and 37 of fixed dimension lead from the common supply chamber 32 to individual discharge chambers 38, 39, 40, and 41. The discharge chambers are formed by appropriate cavities in the instrument casing 31. One wall of each of the discharge chambers is formed by flexible diaphragms 42, 43, 44, and 45. The diaphragms are acted upon on one side by the pressure inside the respective discharge chambers and on the other side, by the pressure in intermediate chambers 46, and 47 communicating with the suction chamber 33 through passages 48 and 49. Individual discharge ducts, the fuel branch lines 21, 22, 23, and 24 extend from the diaphragm chambers 38, 39, 40, and 41 to the points of fluid discharge, in the illustrated example to the intake ducts of the internal combustion engine 19 shown in Figure 1.

The flow of fluid from the discharge chambers 38, 39, 40 and 41 into the branch lines is controlled by a suitable valve arrangement in response to the pressure differential existing between the respective discharge chamber and the pressure in the suction chamber 33. In the illustrated form of apparatus valve seats 50, 51, 52, and 53 are formed by short pieces of tubing cooperating with the diaphragms 42, 43, 44, and 45, respectively. The diaphragms are adapted to seat against the valve seats 50, 51, 52, and 53 to close the branch ducts 21, 22, 23, and 24 if the pressure in the suction chamber exceeds the pressure in the respective discharge chambers. If, on the other hand, the pressure in the respective discharge chamber is greater than the pressure in the suction chamber 33, the valve opens and permits fuel to flow into the respective branch line.

In this manner a constant equal pressure drop is maintained across all of the capillaries 34, 35, 36, and 37, since one end of the capillaries extends into the common supply chamber 32, while the other end is maintained by the valve arrangement at a pressure substantially equal to the pressure in the suction chamber 33.

By reason of this pressure relation equal amounts of fluid pass through the four capillaries 34, 35, 36, and 37, assuming the capillaries are of the same dimensions. The temperature of the four capillaries is also maintained equal at all times by reason of their being mounted in the same solid block or housing 31, whereby inequaliites of fluid flow through the capillaries by reason of temperature inequalities are prevented.

It thus is apparent that equal amounts of fluid are supplied through the branch lines 21, 22, 23, and 24 thereby assuring equal fuel supply to all the cylinders of the internal combustion engine 19.

Means are further provided for by-passing a certain amount of fluid from the common supply chamber 32 to the suction chamber 33 by a variable capillary passage. A passage 54 leads from the common supply chamber 32 to two concentric grooves 55 and 56 in the face 57 of the instrument casing. The grooves are covered to an adjustable extent by a cover plate 58 urged against the face 57 by a spring 59 and rotatable by a shaft 60 having an adjustment lever 61 secured thereto. Rotary adjustment of the lever causes the grooves 55 and 56 to be covered by the cover plate 58 in any desired degree, whereby the effective length of the capillary passage formed by the grooves 55 and 56, and the cover plate 58 may be adjusted.

Fluid is thus by-passed from the common supply chamber 32 through the passage 54, capillary passages 55 and 56 whence it flows into a by-pass chamber 62 and thence through a further passage 63 into the suction chamber 33 to be returned to the return duct 30.

The adjustable capillary passages 55 and 56 are maintained at the same temperature and under the same differential pressure as the fixed capillaries 34, 35, 36, and 37. It is thus possible by simple adjustment of the variable capillaries to by-pass any desired proportion of the fluid supplied through the supply duct. Assuming for example, that the device be so adjusted that $\frac{9}{10}$ of the fluid is by-passed, while $\frac{1}{10}$ is distributed evenly between the four branch lines 21, 22, 23, and 24, and assuming further, that 400 cc. of fluid are supplied to the fluid flow proportioner through the supply duct 26 per time unit, 360 cc. of the fluid are by-passed and returned while 40 cc. are left for distribution among the four branch lines 21, 22, 23, and 24. Assuming the capillaries 34, 35, 36, and 37 to be equal, 10 cc. of fluid is supplied to each branch duct.

The ratio of by-passed fluid to distributed fluid may of course be changed. For example, 99% of the fluid may be by-passed while 1% is distributed, making possible actual control and accurate apportionment between several branch ducts of very small quantities of fluid by a regulator built to handle one hundred times the volume actually used. This is a great advantage since large volumes of fluid are more readily and accurately controllable than small quantities of fluid. The invention thus provides an apparatus for maintaining great accuracy of control of small volumes by means of conventional control equipment designed for larger volumes than those actually desired. No special control equipment is required for controlling small quantities, and the disadvantages of lack of accuracy of such special equipment are avoided.

In devices used in connection with internal combustion engine the differential pressure drop between the common supply chamber 32 and the suction chamber 33 is maintained large enough to make the periodic pressure changes occurring in the intake ducts 11, 12, 13, and 14 negligible in proportion.

Figure 6:
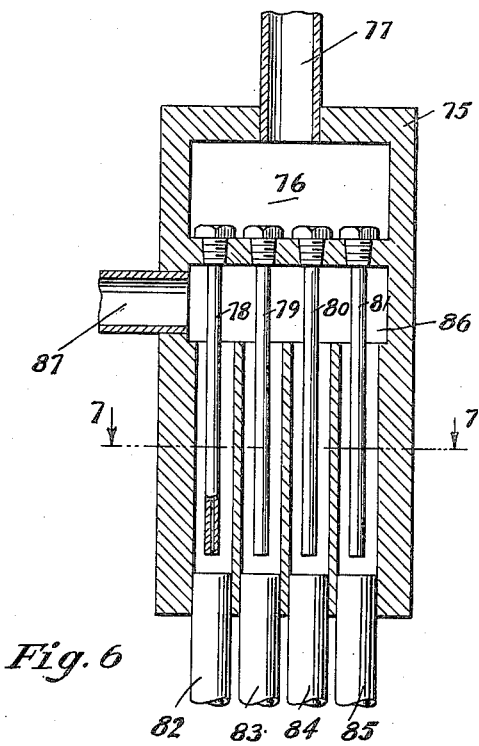
Figure 6 is an elevational side view, partly in section, of yet another form of fluid flow proportioner.
Figure 5:
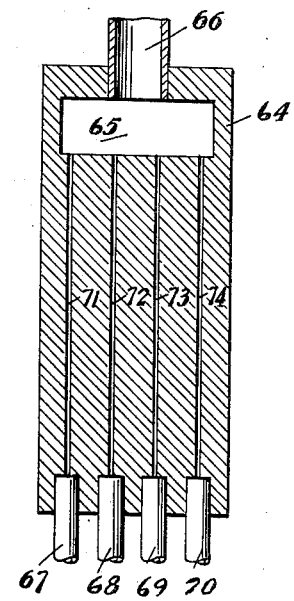
Figure 5 is a vertical cross section of another form of fluid flow proportioner.
Figure 7:
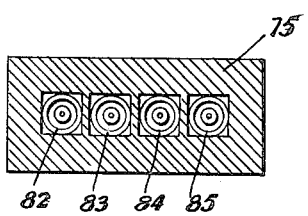
Figure 7 is a sectional view of the apparatus shown in Fig. 6, a section being taken on line 7—7.

Devices for splitting a main flow into a plurality of branch flows of predetermined magnitude are illustrated in Figures 5 to 7.

The device of Figure 5 comprises a housing 64 having a common supply chamber 65 to which a supply duct 66 leads. Individual branch ducts 67, 68, 69 and 70 communicate with the common supply chamber through the capillary passages 71, 72, 73, and 74.

In actual use fluid under pressure is supplied through the supply duct 66. The branch ducts 67, 68, 69, and 70 lead to points of equal pressure, so that the pressure drop across all the capillary passages is maintained equal. Assuming that the four capillary passages have equal dimensions, the volume of liquid supplied to the device is split up into four equal volumes, one-fourth of the flow being discharged through each of the branch ducts.

The device shown in Figures 6 and 7 may be used for the delivery of measured volumes of fluid to points of unequal pressure. The device comprises an instrument housing 75 including a common supply chamber 76 into which fluid is fed through a supply duct 77. From the common supply chamber 76 individual capillary tubes 78, 79, 80 and 81 lead to branch ducts 82, 83, 84, and 85. The four branch ducts are in communication with one another and terminate in a suction chamber 86 from which a suction duct 87 leads to a point of reduced pressure.

In the operation of the device shown in Figures 6 and 7 fluid is supplied through the supply duct 77. Fluid may be supplied under pressure or may be at atmospheric pressure. In either case the pressures of the fluid at the entrances of the four capillary passages are equal. The pressures at the ends of the capillary passages are also equal and substantially the same as the pressure in the suction chamber 86 which is suitably maintained constant. Changes in the pressure in the suction chamber 86 effect all of the four capillaries equally and therefore do not upset the ratio between the several branch flows.

It is evident that the device may be supplied with fluid under pressure in which event the suction duct 87 may be in communication with the atmosphere. In the latter case the pressure at the ends of the four capillary tubes is atmospheric pressure. The accuracy of the device is not affected by changes in pressure at the far ends of the branch ducts, which may be of considerable length.

The invention thus provides a simple and efficient device for dividing a main flow of fluid into several branch flows. All of the branch flows may be utilized as it is the case, for example, in the embodiments of Figures 5 and 6. The branch flows may be of equal or of unequal magnitude depending on the comparative flow resistance of the capillary passages. In the embodiment of Figure 3 one of the branch flows is many times the volume of each of the remaining branch flows and is returned to the source of pressure fluid. The remaining branch flows may be either equal or unequal magnitude depending on the flow resistance of the capillaries employed.

The embodiment of Figure 3 is admirably suited for the control of minute flows in connection with a flow regulator originally designed for controlling much larger volumes. By varying the by-passed volume any desired volume may be supplied to each of the branches. Changes in the branch volumes do not require any changes in the regulator but may be brought about by a simple adjustment of the flow proportioner. It is thus possible to employ available regulators designed for a particular volume and ratio in order to produce smaller branch volumes in any other ratio without modification of the regulator itself.

Obviously the present invention is not restricted to the particular embodiments shown and described but may be embodied in other forms. Thus various changes, additions, omissions and modifications may be made depending on the particular requirements, without departure from the spirit and teaching of this invention.

What is claimed is:

1. A fluid flow proportioner comprising, a fluid supply manifold adapted to receive fluid to be distributed; a plurality of branch passages branching from said manifold; a variable capillary metering restriction in at least one of said branch passages; a constant capillary metering restriction in each of the remaining branch passages; and a control pressure manifold including passageways for transmitting the pressure in said control pressure manifold to the downstream end of said capillary passages.

2. A fluid flow proportioner comprising a housing, a fluid supply manifold in said housing for receiving fluid to be distributed; a plurality of branch passages branching from said manifold within said housing; a variable capillary metering restriction in at least one of the branch passages in said housing; a constant capillary metering restriction in each of the remaining branch passages in said housing; and a control pressure manifold including passageways for transmitting the pressure in said control pressure manifold to the downstream end of said capillary passages.

3. A fluid flow proportioner, comprising, in combination, a common fluid supply chamber; a plurality of individual discharge chambers; individual discharge ducts leading from said discharge chambers; a capillary passage between each of said discharge chambers and said common supply chamber; valve means for controlling admission of fluid from said individual discharge chambers into the respective discharge ducts; a suction chamber; and differential pressure responsive means acted upon by the pressure in said suction chamber and said respective discharge chambers for actuating said valve means in a sense to maintain equal pressure in said discharge chambers.

4. A fluid flow proportioner comprising, in combination, a common fluid supply chamber; a plurality of individual discharge chambers, each chamber having a movable wall acted upon on one side by the pressure in the respective chamber; individual discharge ducts leading from said discharge chambers; a capillary passage between each of said discharge chambers and said common supply chamber; a low pressure duct including passages leading to the other side of said movable walls to transmit the pressure in the low pressure duct to the other side of said movable walls; a capillary passage between said low pressure duct and said common supply chamber;

and valve operable by said movable walls for controlling admission of fluid from said discharge chambers into the respective discharge ducts, the valves being so arranged that the pressure in the low pressure duct tends to close them.

5. A fluid flow proportioner comprising, in combination, a common fluid supply chamber; a plurality of individual discharge chambers, each chamber having a movable wall acted upon on one side by the pressure in the respective chamber; individual discharge ducts leading from said discharge chambers; a capillary passage between each of said discharge chambers and said common supply chamber; a low pressure duct including passages leading to the other side of said movable walls to transmit the pressure in the low pressure duct to the other side of said movable walls; a variable capillary passage between said low pressure duct and said common supply chamber; and valves operable by said movable walls for controlling admission of fluid from said discharge chambers into the respective discharge ducts, the valves being so arranged that the pressure in the low pressure duct tends to close them.

6. A fluid flow proportioner comprising, in combination, a common fluid supply chamber; a low pressure duct; a variable capillary passage between said supply chamber and said low pressure duct; a plurality of diaphragms acted upon on one side by the pressure in said low pressure duct; a plurality of discharge ducts; a capillary passage leading from said supply chamber to the other side of each of said diaphragms; and valves operable by said diaphragms for controlling flow of fluid from the downstream side of said last named capillary passages into the prospective discharge ducts, the valves being so arranged that the pressure in the low pressure duct tends to close them.

7. In an automatic flow regulating system for fluids, a manifold adapted to receive the fluid to be regulated, said manifold having a plurality of conduits branching therefrom for conducting the fluid to points of discharge, a calibrated metering restriction in each of said branch conduits upstream of each of said points of discharge, a regulating valve in each conduit downstream of each metering restriction, said manifold being common to said branch conduits for maintaining the pressure upstream of said restrictions substantially equal in all conduits, a movable wall connected to each of said valves, each said wall being subjected on one side thereof to the pressure of fluid in its associated conduit downstream of the restriction in said conduit, and means for conducting a regulating fluid to the opposite side of each said wall to thereby maintain the pressure downstream of said restrictions at a given value or values in all conduits and thereby render the flow of fluid to said discharge points proportional to the drop across said restrictions.

8. A fluid distributing system comprising a plurality of valve housings, each of said housings having a movable member dividing said housing into first and second chambers, each of said housings also having a fluid discharge opening communicating with said first chamber and having a valve connected to the associated movable member for controlling the associated discharge opening; a fluid manifold; first passageways connecting said manifold with each of said first chambers; means for supplying a fluid under pressure to said manifold for distribution therefrom through said passageways, through the first chambers and thence through the discharge openings of said chambers, the fluid pressure in each of said first chambers urging the associated movable member in a direction for opening its valve; means providing a source of fluid pressure less than the pressure of the fluid supplied to said manifold; second passageways connecting said source of fluid pressure with each of said second chambers, the fluid pressure in each of said second chambers urging the associated movable member in a direction for closing its valve; and a restrictive orifice in each of said first passageways.

9. A fluid distributing system comprising a manifold having a plurality of branch conduits branching therefrom for conducting the fluid to points of discharge; a calibrated metering restriction in each of said branch conduits upstream of each of said points of discharge; a regulating valve in each branch conduit downstream of each metering restriction, said manifold being common to said branch conduits for maintaining the pressure upstream of said restriction substantially equal in all branch conduits; a movable wall connected to each of said valves, each of said walls being subjected on one side thereof to the pressure of the fluid in its associated conduit downstream of the restriction in said associated conduit tending to open the associated valve upon an increase in pressure on said one side; and means for conducting a regulating fluid to the opposite side of each said wall tending to close the valve upon an increase in pressure on said opposite side, said regulating fluid conducting means being common to said movable walls to maintain equal pressure on the opposite side of said movable walls, whereby the pressure downstream of said restrictions is maintained at a given value or values in all branch conduits and the flow of fluid to said discharge points becomes proportional to the drop across said restrictions.

10. A fluid distributing system comprising, a manifold adapted to receive the fluid to be distributed; a plurality of fluid passages branching from said manifold; a valve in each of said passages dividing the respective passage into an upstream portion upstream of the respective valve and a downstream portion downstream of the respective valve; a metering restriction in each of said upstream portions; a movable operating member connected to each of said valves including enclosure means for each of said movable member providing a first chamber on one side of the movable member and a second chamber on the opposite side of the movable member, the said one side of the movable member being subjected to the pressure at the downstream side of the respective metering restriction; and a control pressure manifold including passageways for transmitting the pressure in said control pressure manifold to other side of said movable members, the valves being so connected to said movable operating members as to move in an opening direction under the influence of the fluid pressure in the first chamber and in a closing direction under the influence of the fluid pressure in the second chamber.

11. A fluid distributing system comprising, a first manifold adapted to receive the fluid to be distributed; a plurality of fluid passages branching from said manifold; a valve in each of said passages dividing the respective passage into an upstream portion upstream of the respective valve and a downstream portion downstream of the respective valve; a metering restriction in each of said upstream portions; a movable operating member connected to each of said valves including enclosure means for each of said movable members providing a first chamber on one side of the movable member and a second chamber on the opposite side of the movable member, the said one side of the movable member being subjected to the pressure at the downstream side of the respective metering restriction; and a control pressure manifold including passageways for transmitting the pressure in said control pressure manifold to the other side of said movable members, the valves being so connected to said movable operating members as to move in an opening direction under the influence of the fluid pressure in the first chamber and in a closing direction under the influence of the fluid pressure in the second chamber.

12. A fluid distributing system comprising, a first manifold adapted to receive the fluid to be distributed; a plurality of fluid passages branching from said manifold; a valve in each of said passages dividing the respective passage into an upstream portion upstream of the respective valve and a downstream portion downstream of the respective valve; a metering restriction in each of said upstream portions; a movable operating member connected to each of said valves including enclosure means for each of said movable members providing a first chamber on one side of the movable member and a second chamber on the opposite side of the movable member, the said one side of the movable member being subjected to the pressure at the downstream side of the respective metering restriction; a control pressure manifold including passageways for transmitting the pressure in said control pressure manifold to the other side of said movable members, the valves being so connected to said movable operating members as to move in an opening direction under the influence of the fluid pressure in the first chamber and in a closing direction under the influence of the fluid pressure in the second chamber; a by-pass passage leading from said first manifold to said control pressure manifold; and a variable metering restriction in said by-pass passage.

13. A fluid distributing system comprising a plurality of valves; a plurality of passageways, one for each of said valves; means for supplying a fluid under pressure to said passageways for distribution by said valves; a restriction in each of said passageways on the inlet side of the associated valve; a plurality of movable members, one for each of said valves, each of said movable members being subjected to the pressure of said fluid at the inlet side of its valve downstream of the associated restriction for urging its valve in an opening direction; means providing a fluid pressure less than the pressure of the fluid supplied to said passageways; and passageways for transmitting said second-mentioned fluid pressure to said members for urging said valves in a closing direction.

14. A fluid distributing system as recited in claim 13 in which said restrictions are identical.

References Cited in the file of this patent

UNITED STATES PATENTS

| Number | Name | Date |
|---|---|---|
| 1,318,676 | Lawrence | Oct. 14, 1919 |
| 2,006,865 | Lake | July 2, 1935 |
| 2,037,994 | Neubauer | Apr. 21, 1936 |

FOREIGN PATENTS

| Number | Country | Date |
|---|---|---|
| 526,869 | Germany | of 1931 |